United States Patent
Schmidt et al.

(10) Patent No.: US 6,924,572 B2
(45) Date of Patent: Aug. 2, 2005

(54) WEATHER PROTECTED MODULAR MOTOR ENCLOSURE

(75) Inventors: Ronald W. Schmidt, St. Louis, MO (US); R. Todd Middleton, Ballwin, MO (US); Kenneth R. Friedman, Smithton, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/709,118

(22) Filed: Apr. 14, 2004

(65) Prior Publication Data

US 2004/0189119 A1 Sep. 30, 2004

Related U.S. Application Data

(62) Division of application No. 10/248,662, filed on Feb. 6, 2003, now Pat. No. 6,750,573.

(51) Int. Cl.$^7$ .............................................. H02K 9/00
(52) U.S. Cl. ..................................... 310/89; 310/59
(58) Field of Search ............................. 310/85, 88, 89, 310/52–64

(56) References Cited

U.S. PATENT DOCUMENTS

| | | | | |
|---|---|---|---|---|
| 1,476,776 A | * | 12/1923 | Stamm et al. ............... | 417/350 |
| 1,998,087 A | * | 4/1935 | Koch, Jr. ..................... | 310/62 |
| 2,488,365 A | * | 11/1949 | Abbott et al. ................. | 310/62 |
| 3,666,978 A | * | 5/1972 | Renner ........................ | 310/62 |
| 3,719,843 A | * | 3/1973 | Dochterman ................ | 310/89 |
| 3,740,599 A | * | 6/1973 | Dochterman ................ | 310/91 |
| 4,958,095 A | * | 9/1990 | Uchida et al. ................ | 310/59 |
| 6,107,708 A | * | 8/2000 | Yamaguchi et al. .......... | 310/58 |
| 6,528,919 B2 | * | 3/2003 | Fujii et al. ..................... | 310/88 |
| 6,750,573 B1 | * | 6/2004 | Schmidt et al. ............... | 310/59 |
| 6,762,521 B2 | * | 7/2004 | Peter et al. .................... | 310/89 |

* cited by examiner

Primary Examiner—Dang Le
(74) Attorney, Agent, or Firm—Hovey Williams LLP

(57) ABSTRACT

An air-cooled weather-protected motor (10) configured for vertical-shaft applications, such as mounting above an outdoor, vertical-shafted pump (P) for pumping fluid (e.g., water, oil, etc.) through a pipeline (L), is disclosed. The illustrated motor (10) broadly includes a stator (12), a shafted rotor assembly (14) rotatably supported relative to the stator (12), and a vented protective motor enclosure (16) enclosing the stator (12) and the rotor assembly (14). The enclosure (16) includes a primary motor housing (18) and a pair of filtration boxes (20) and (22) removably coupled to either side of the housing (18) to guard air intake through the housing (18) to the stator (12) and the rotor assembly (14). The improved motor enclosure (16) provides an inventive coupling mechanism that enables the modular filtration housings (20,22) to be quickly and easily secured to the primary motor housing (18) to protect the air intake openings (68,70) from weather and other undesired debris. The housings (20,22) comply with the NEMA standards for a weather-protected Type II motor and thus enable a weather-protected Type I motor to be quickly and easily converted to a Type II motor. When assembled on the motor (10) according to a preferred embodiment, the pair of filtration housings (20,22) provide optimal and uniform cooling of the motor (10) and enable a symmetrical, balanced motor (10) that can be tested on a horizontal dynamometer with the housings (20,22) attached.

32 Claims, 5 Drawing Sheets

WEATHER PROTECTED MODULAR MOTOR ENCLOSURE

CROSS REFERENCE TO RELATED APPLICATIONS

This application is a division of application Ser. No. 10/248,662, filed Feb. 6, 2003, now U.S. Pat. No. 6,750,573 which is hereby incorporated by reference herein.

BACKGROUND OF INVENTION

1. Field of the Invention

The present invention relates generally to filtration housings for motors. More specifically, the present invention concerns modular filtration housings that hook on to the primary motor housing (i.e., housing protecting the stator and rotor) to protect the air intake openings from weather and other undesired debris. Each housing includes an inventive latching mechanism that enables the housing to be quickly and easily secured to the motor. Each housing complies with the National Electrical Manufacturers Association ("NEMA") standards for a weather-protected Type II motor, therefore, the inventive housings enable a weather-protected Type I motor to be quickly and easily converted to a Type II motor. When assembled on the motor according to a preferred embodiment, the pair of filtration housings provide optimal and uniform cooling to the motor and enable a symmetrical, balanced motor that can be tested on a horizontal dynamometer with the housings attached.

2. Discussion of Prior Art

NEMA standard 1.25.8.1 defines a weather-protected Type I motor as a guarded motor with its ventilating passages so constructed as to minimize the entrance of rain, snow and air-borne particles to the electric parts. NEMA standard 1.25.8.2 defines a weather-protected Type II motor as a Type I motor additionally having its ventilating passages at both intake and discharge so arranged that high-velocity air and air-borne particles blown into the motor by storms or high winds can be discharged without entering the internal ventilating passages leading directly to the electric parts of the motor itself. NEMA standard 1.25.8.2 further requires the normal path of ventilating air which enters the electric parts to be so arranged by baffling or separate housings as to provide at least three abrupt changes in direction, none of which shall be less than ninety degrees. NEMA standard 1.25.8.2 additionally provides that either an area of low velocity not exceeding six-hundred feet per minute or an easy to clean (e.g., removable) filter shall be provided in the intake air path to minimize the possibility of moisture or dirt being carried into the electric parts of the motor.

Motors that satisfy the above-described NEMA standards for Type I motors are typically provided in most ratings ranging from small, fractional horsepower motors to very large horsepower motors (e.g., in excess of 10,000 HP). Type II motors are typically provided in ratings of three-hundred horsepower or higher. Both Type I and Type II motors can be used for a wide array of applications (e.g., horizontal or vertical-shaft pumps, indoor or outdoor generators, etc.). Type I motors do not require the additional filtration housings and thus are typically less expensive, lighter weight, and less part-intensive than the Type II motors. In this regard, depending on the ratings, these motors can weigh in excess of several tons. For example, a 1000 HP Type II motor can weigh as much as three tons with the filtration housing weighing several hundred pounds. It is preferred to use the less expensive Type I motors where possible, however, whether a Type I or Type II motor is appropriate for the specific application is largely governed by the operating environment for the application. Type I motors are typically used in fairly clean indoor applications or outdoors where there is sufficient protection from the elements (e.g., an overhead roof, etc.). Type II motors are typically utilized in relatively dirtier atmospheres where windborne dirt and/or moisture may be present. When the Type I motor is operating in a border line environment, it is desirable to utilize a Type II motor instead. Accordingly, it is desirable to have a motor that can be converted from a Type I to Type II motor.

Commercial motors that satisfy the above-described NEMA standards for either Type I or Type II motors are known in the art. These prior art motors typically include a stator and a rotor rotatably supported in a primary housing for driving a shaft coupled to the rotor. For a Type I motor, the intake openings formed in the housing are typically guarded by simple screens. For a Type II motor, the majority of the primary housing is typically guarded by a large shroud-like filtration housing that defines air flow to the intake openings. One example of these prior art motors are Emerson Electric Co.'s (the assignee of the present application) motors previously available under the designation Titan I.

While the Titan I motors were the most advanced motors in the art at the time, these prior art motors, like all other prior art motors, are problematic and subject to several undesirable limitations. For example, prior art motors are typically specially manufactured as either a Type I or a Type II motor, and cannot be readily converted to the other Type. In order to redesign a Titan I Type I motor to a Type II motor, for example, the shroud-like structure must be specially cut and welded around several motor fittings (e.g., the oil supply lines, the oil drain lines, etc.). If the shroud is not properly manufactured to fit, oil can undesirably drain into the motor without easy detection. This special manufacture is further hindered by the weight of the shroud (e.g., the shroud must be supported by a crane during fitting and manufacture) and is both part and labor intensive. For example, an entire day of man hours is required to specially manufacture and fit a Type II shroud on a Type I Titan I motor. The uniqueness of the prior art Type I and Type II motors undesirably necessitates stocking both Type I motors and Type II motors, resulting in undesirably high inventory costs. Additionally, the prior art Type II motors either undesirably draw hot exhausted air back into the intake openings or require an asymmetrical, unbalanced housing design that does not optimally and uniformly cool the motor (e.g., providing a "hot side" to the motor, etc.).

SUMMARY OF INVENTION

The present invention provides an improved weather-protected modular motor enclosure that does not suffer from the problems and limitations of the prior art motors described above. The improved motor enclosure of the present invention provides an inventive latching mechanism that enables modular filtration housings to be quickly and easily secured to the primary motor housing to protect the air intake openings from weather and other undesired debris. The housings comply with the NEMA standards for a weather-protected Type II motor, therefore, the inventive housings enable a weather-protected Type I motor to be quickly and easily converted to a Type II motor. Accordingly, Type I motors of the present invention can be stocked along with the inventive and simple Type II conversion kits. When assembled on the motor according to a preferred embodiment, the pair of filtration housings provide optimal and uniform cooling to the motor and enable a symmetrical, balanced motor that can be tested on a horizontal dynamometer with the housings attached.

A first aspect of the present invention concerns an air-cooled weather-protected motor broadly including a stator, a rotor rotatable relative to the stator about a rotational axis, and a vented protective motor enclosure protectively enclosing the stator and rotor while permitting airflow thereto. The enclosure includes a primary motor housing in which the stator and rotor are at least substantially housed. The motor housing presents a plurality of spaced apart air intake openings through which ambient air is induced into the motor housing when the rotor is rotated. The intake openings are arranged so as to present at least one pair of generally diametrically opposed intake openings relative to the rotational axis. The enclosure further includes a plurality of spaced apart air intake boxes, each of which is coupled to the motor housing in association with a respective one of the at least one pair of intake openings. Each of the boxes includes at least one air inlet and defines at least one passageway fluidly communicating the inlet and the respective one of the air intake openings.

A second aspect of the present invention concerns an air-cooled weather-protected motor broadly including a stator, a rotor rotatable relative to the stator about a rotational axis, a vented protective motor enclosure protectively enclosing the stator and rotor while permitting airflow thereto, and a coupling mechanism. The enclosure includes a primary motor housing in which the stator and rotor are at least substantially housed. The motor housing presents a plurality of spaced apart air intake openings through which ambient air is induced into the motor housing when the rotor is rotated. The enclosure further includes an air intake box removably coupled to the motor housing in association with at least one of the intake openings. The intake box is configured to generally filter ambient air drawn into the enclosure and includes at least one air inlet and defining at least one deviated passageway fluidly communicating the inlet and the at least one intake opening. The coupling mechanism removably couples the intake box to the motor housing and includes an adapter plate and at least one hook latchingly engaging the adapter plate to support the intake box on the motor housing.

A third aspect of the present invention concerns a method of converting a weather-protected type I motor to a weather-protected type II motor wherein the weather-protected type I motor includes a motor housing presenting an air intake opening, a screen guarding the opening, and a rotor rotatably supported in the housing for drawing air through the intake opening. The method broadly includes the steps of removing the screen from the opening coupling an adaptor plate to the housing, forming an air passageway including an air inlet in an intake box, hanging the intake box onto the adaptor plate, and securing the intake box to the adaptor plate so that air drawn through the opening is first drawn through the inlet and the passageway.

Other aspects and advantages of the present invention will be apparent from the following detailed description of the preferred embodiments and the accompanying drawing figures.

BRIEF DESCRIPTION OF DRAWINGS

Preferred embodiments of the invention are described in detail below with reference to the attached drawing figures, wherein.

DETAILED DESCRIPTION

Figure 1:
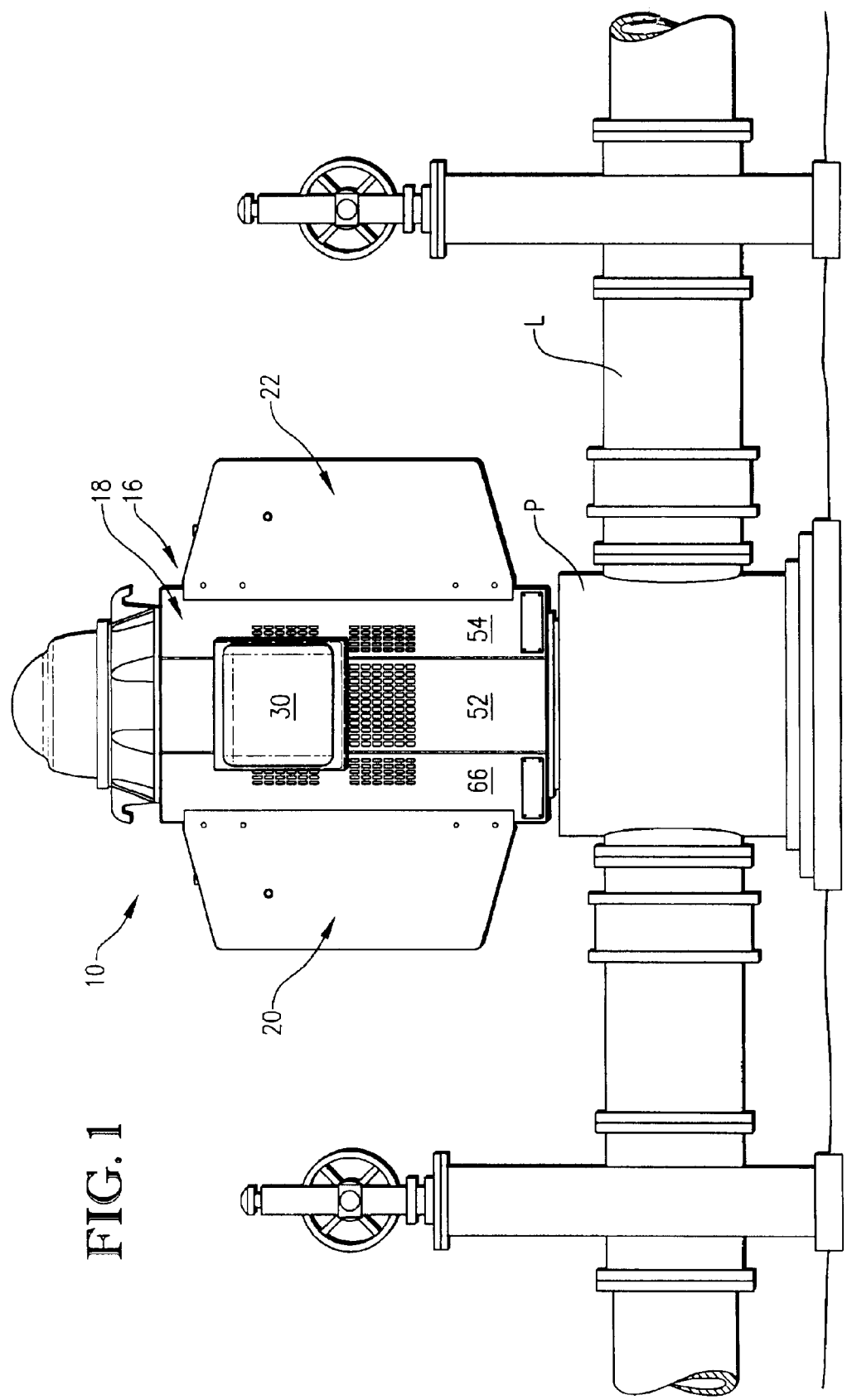
FIG. 1 is a front elevational view of a weather-protected motor constructed in accordance with a preferred embodiment of the present invention including a pair of symmetrical filtration boxes guarding the intake openings and shown mounted above an outdoor, vertical-shafted pump in a fluid pipeline.

FIG. 1 illustrates an air-cooled weather-protected motor 10 constructed in accordance with the principles of a preferred embodiment of the present invention and configured for vertical-shaft applications. For example, the motor 10 illustrated in FIG. 1 is shown mounted above an outdoor, vertical-shafted pump P for pumping fluid (e.g., water, oil, etc.) through a pipeline L. As detailed below, the illustrated motor 10 is an open-type motor that complies with NEMA standards for a weather-protected Type II motor. However, the principles of the present invention are not limited to any certain classification of weather-protected motors but rather apply equally to virtually any type of air-cooled motor having guarded intake openings. Additionally, the principles of the present invention are not limited to vertical shaft motors but also apply to other types of motors, such as horizontal shaft motors. The illustrated motor 10 broadly includes a stator 12, a shafted rotor assembly 14 rotatably supported relative to the stator 12, and a vented protective motor enclosure 16 enclosing the stator 12 and the rotor assembly 14 (see FIGS. 1 and 4). The enclosure 16 includes a primary motor housing 18 and a pair of filtration boxes 20 and 22 removably coupled to either side of the housing 18 to guard air intake through the housing 18 to the stator 12 and the rotor assembly 14.

Figure 4:
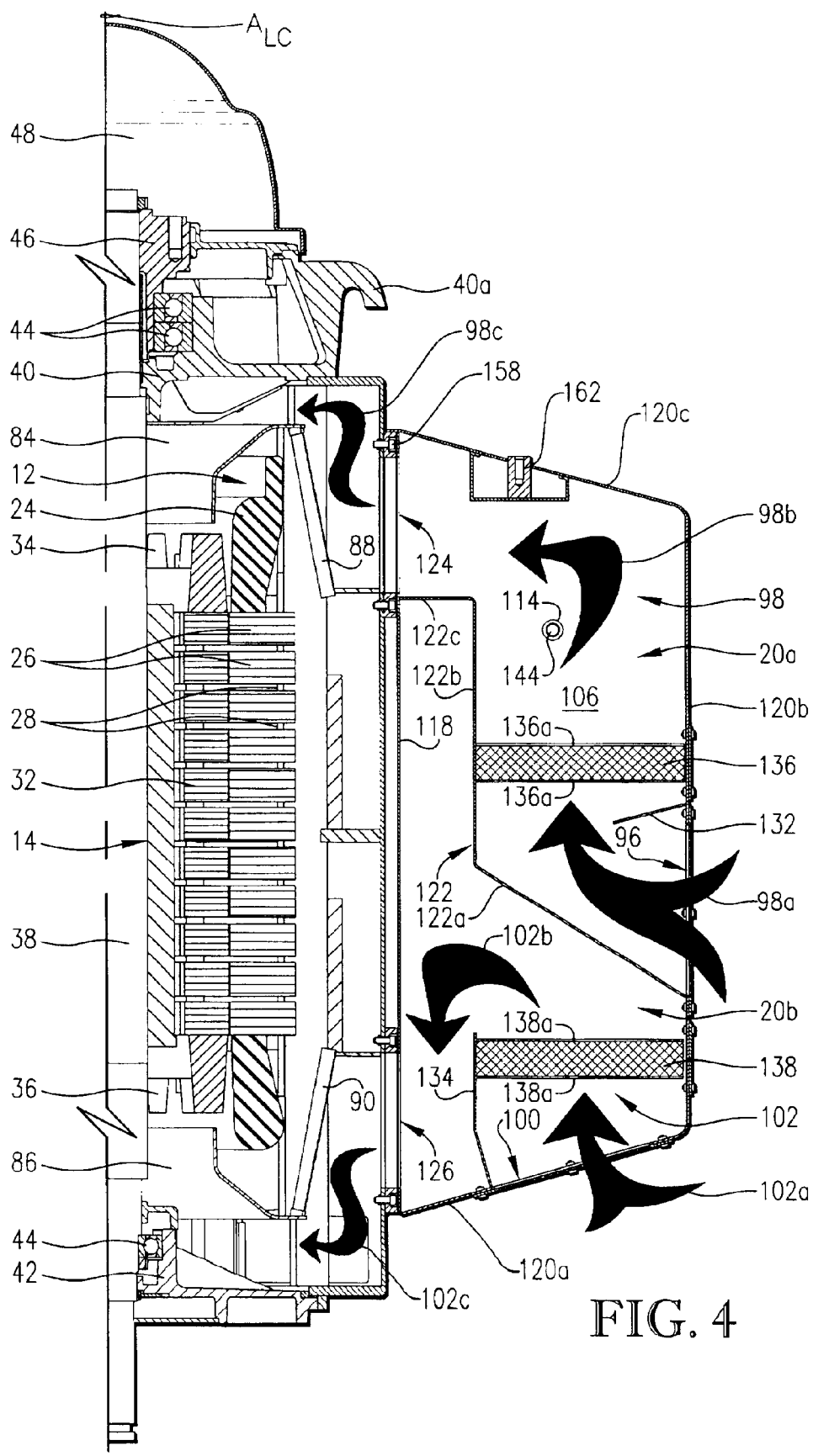
FIG. 4 is a sectional view of the right side of the motor taken generally along the longitudinal center and showing air flow (designated by arrows) through the passageways formed by the right filtration box with filters being mounted in the box.

Turning initially to FIG. 4, the illustrated motor 10 is a solid shaft, three-phase induction motor (e.g., 1000 HP, 1800 rpm rating). In one manner well known in the art, the stator 12 includes a core including a wire coil 24 wound longitudinally through a lamination stack formed of lamination packets 26 (e.g., iron, steel, etc.) and metal bars 28 (e.g., aluminum, steel, etc.) separating the packets 26 to form air ducts therebetween. The core of the stator 12 is fixed relative to the inside of the primary motor housing 18 (e.g., shrink-fitted, pinned, etc.). The wire coil 24 is electrically connected to an electrical conduit box 30 (see FIG. 1) operable to interconnect to a three-phase power source. The rotor assembly 14 includes a similar lamination stack 32 in a concentric relationship to the core of the stator 12 and rotatably supported relative thereto. The rotor assembly 14 further includes end rings 34 and 36 fixed to the ends of the stack 32. Each of the end rings 34,36 includes integrally formed fan blades for drawing ambient air through the rotor assembly 14 and the stator 12 when the rotor assembly 14 is rotated. In this manner, the motor 10 is an air-cooled motor. The rotor assembly 14 also includes a shaft 38 fixed relative to the stack 32 so that the shaft 38 rotates around a central rotational axis with the stack 32. The illustrated shaft 38 is a spider shaft and in one manner known in the art is rotatably supported on the motor housing 18 by top and bottom annular brackets 40 and 42, with each bracket 40,42 being fixed relative to the motor housing 18 (e.g., bolted, etc.) and a plurality of bearings 44 separating the brackets 40,42 and the shaft 38. To facilitate lifting the motor 10, the top bracket 40 includes a pair of integrally formed lifts 40a and 40b (e.g., operable to hook to a crane, hoist, etc.). The bearings 44 are lubricated by an oil sump and accordingly a separate bearing mounting 46 is affixed to the shaft 38 with a slip fit and is retained with a locknut. The above-described drive components are guarded from above by a canopy cap 48. It is within the ambit of the present invention to utilize various alternative configurations known in the art for the rotor assembly and the stator, such as for example, a rotor powered by power sources that do not use three-phase, induction power, or a rotor assembly having a hollow shaft, etc. However, it is important that the motor at least in part utilizes air-cooling to cool some of the power-driving components of the motor.

Turning now to FIGS. 1–4, the motor enclosure 16 protectively encloses the stator 12 and the rotor assembly 14 to guard them from undesired weather and debris while still permitting airflow to the stator 12 and the rotor assembly 14. As will be subsequently described in detail, the primary motor housing 18 can be utilized without the filtration boxes 20,22 to operate the motor as a weather-protected Type I motor and the filtration boxes 20,22 can be used with the motor housing 18 to operate the motor as a weather-protected Type II motor. The primary motor housing 18 is a generally hollow cylindrical body that rotatably supports the rotor assembly 14 inside the cylindrical body and supports the filtration boxes 20,22 on the outside of the cylindrical body. In more detail, the illustrated motor housing 18 includes an external wall 50 that presents eight generally equal sides 52, 54, 56, 58, 60, 62, 64, and 66 that define an octagonal cross-sectional shape for the motor housing wall 50. In this regard, the motor housing 18 defines a longitudinal center axis (designated as $A_{LC}$ in FIG. 4) and each of the sides 52,54,56,58,60,62,64,66 are equally spaced and symmetrically arranged around the axis $A_{LC}$. The center axis $A_{LC}$ is coextensive with the rotational axis of the rotor assembly 14.

As previously indicated, in operation the rotor assembly 14 is at least in part cooled by air drawn through the rotor assembly 14. In this regard, the primary motor housing 18 includes a plurality of air intake openings and exhaust openings formed through the external wall 50. Particularly, the illustrated housing 18 includes a pair of air intake openings formed through the wall side 64, including an upper intake opening 68 and a lower intake opening 70 (see FIG. 3). The housing 18 further includes an identical pair of air intake openings, diametrically opposite the openings 68,70, formed through the motor housing wall side 56 (not shown). In addition, the housing 18 includes a plurality of bottom air intake openings 72, one each formed through the corresponding wall sides 54,58, 62,66 (with only the bottom opening 72 formed through the side 62 being shown in FIG. 3). As will be subsequently described in detail, the motor 10 can be converted for operation as either a weather-protected Type I or Type II motor. When the motor 10 is operated as a Type II motor as illustrated, the bottom openings 72 are not used and thus are covered with intake covers 74 (see, e.g., FIG. 2).

Figure 2:
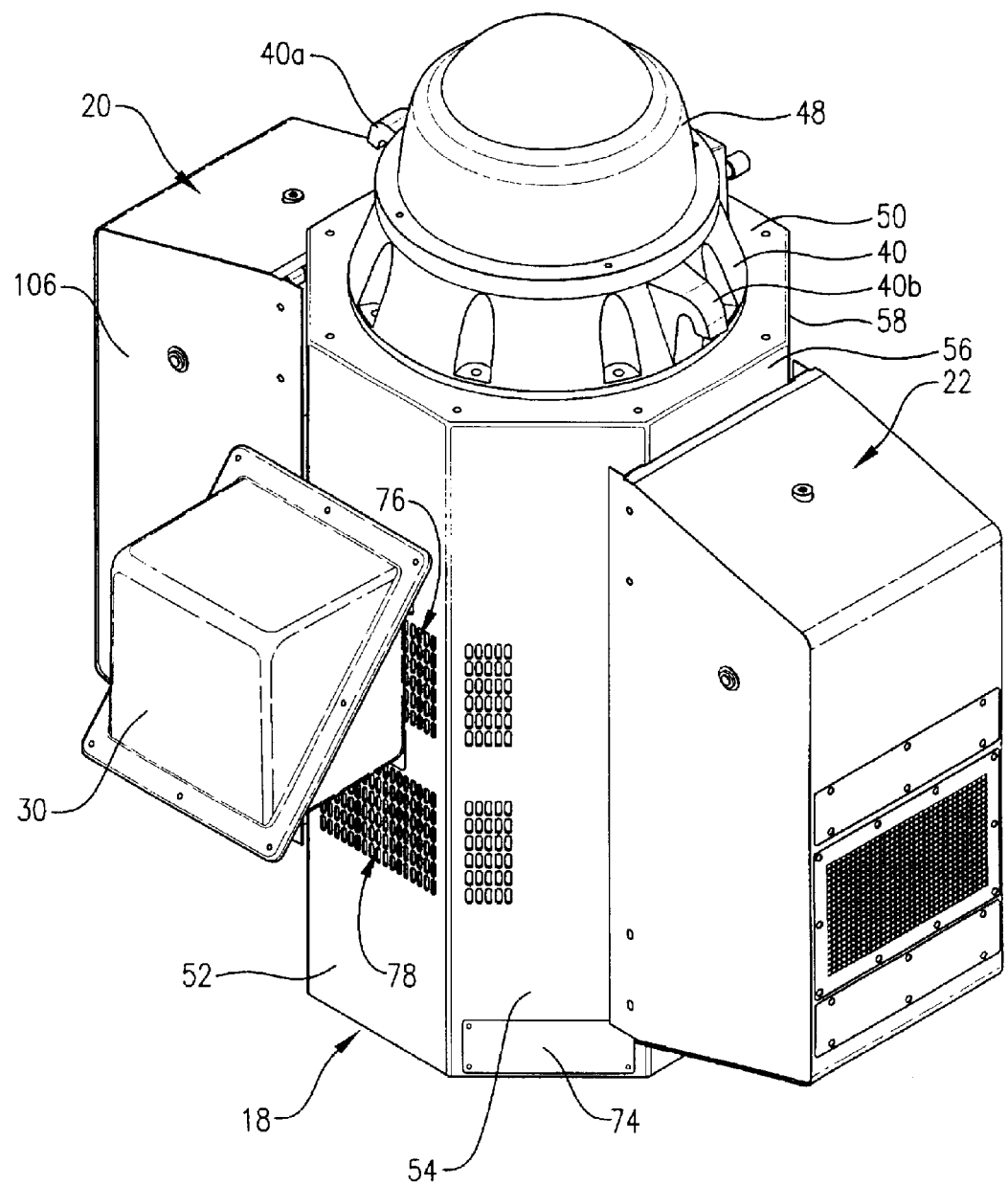
FIG. 2 is a perspective view of the motor illustrated in FIG. 1 showing the front exhaust openings and the right filtration box.
Figure 3:
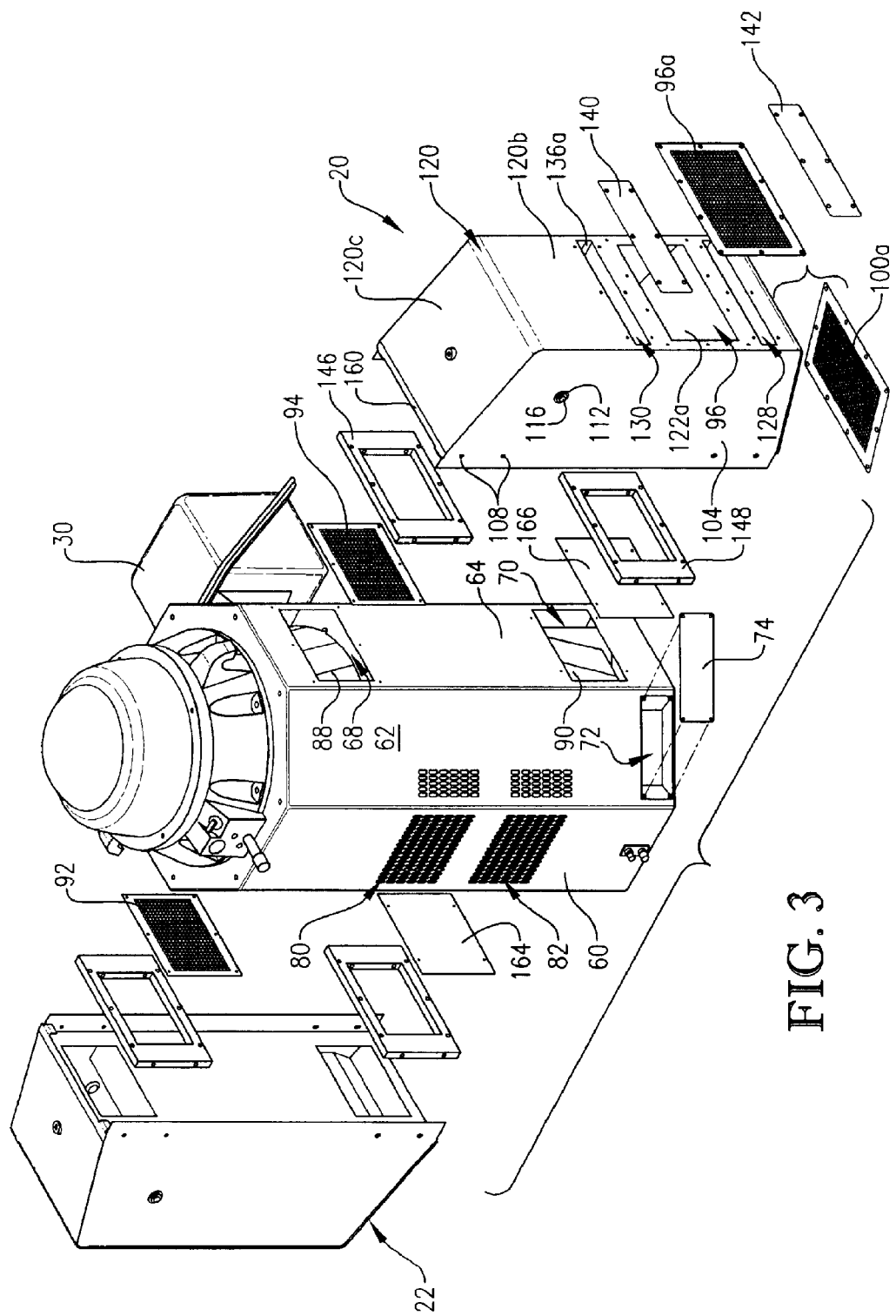
FIG. 3 is an exploded view of the motor showing the rear exhaust openings and showing both the Type I and Type II components in an assembly view illustrating a conversion.

The primary motor housing 18 also includes a plurality of air exhaust openings 76, 78, 80, and 82 formed through the motor housing wall 50 (see FIGS. 2 and 3). Each of the illustrated exhaust openings 76,78,80,82 includes a plurality of smaller apertures formed through the wall 50 that cooperate to define the corresponding exhaust opening 76,78,80, 82. For purposes that will subsequently be described, the apertures of each opening are generally arranged around a center axis that is located vertically between the intake openings 68,70 and located on a wall side that is offset from both sides 56 and 64 by at least ninety degrees. The illustrated exhaust openings 76,78 are generally located on wall side 52 (see FIG. 2) and the exhaust openings 80,82 are generally located on wall side 60 (see FIG. 3). Although a small portion of the apertures that form the exhaust openings 76,78 are located on either wall side 54 or 66, the majority of the corresponding apertures are located on side 52, as is the center axis of the openings 76,78, and thus at least a portion of the exhaust openings 76,78 are at least ninety degrees offset from the intake openings 68,70 as that phrase is used herein.

For purposes that will subsequently be described, the primary motor housing 18 also includes top and bottom annular air deflectors 84 and 86, respectively (see FIG. 4). Each of the deflectors 84,86 encircle the rotor assembly 14. The housing 18 further includes top and bottom annular air dams 88 and 90, respectively (see FIG. 3). Each of the dams 88,90 extends around the interior circumference of the external wall 50 and is positioned between the wall 50 and the rotor assembly 14. As will be described in detail below, the air dams 88,90 cooperate with the corresponding air deflectors 84,86 to direct air flow from the air intake openings (e.g., intake openings 68,70) into the rotor assembly 14.

As previously indicated, and as will be further detailed below, the illustrated motor 10 complies with NEMA standards for a weather-protected Type II motor, however, the motor 10 can be converted for operation as a weather-protected Type I. As shown in FIG. 3, in order to convert the motor 10 to a Type I, the primary motor housing 18 of the vented protective motor enclosure 16 is utilized without the filtration boxes 20,22. Further, filter screens 92 and 94 are placed (e.g., with threaded fasteners, etc.) over the upper intake openings (e.g., screen 94 is placed over the intake opening 68) and the intake covers 74 are removed from the bottom intake openings 72. Regardless of whether the motor is operated as a Type I or Type II, the motor housing 18 is configured to provide optimum and even cooling of the power-driving components 12,14. In this regard, all of the intake openings include a complemental, diametrically opposed intake opening to enable cooling air to be induced into the motor housing 18 evenly on both sides of the rotor 14. Additionally, the exhaust openings 76,78,80,82 are all located between the upper and lower or bottom intake openings 68 and 70,72, respectively. That is to say, the exhaust openings 76,78,80,82 are each spaced along the center axis $A_{LC}$ from each of the intake openings 68,70,72 so that any plane that intersects one of the exhaust openings 76,78,80,82 and the center axis $A_{LC}$ and that is orthogonal to the center axis $A_{LC}$ does not also intersect any of the intake openings 68,70,72. Furthermore, the exhaust openings 76,78,80,82 are all offset by at least ninety degrees relative to all intake openings positioned above the exhaust openings 76,78,80,82 (e.g., the upper intake openings including opening 68). In this manner, cool ambient air is induced evenly into both sides of the motor housing 18 and hot air that has been drawn through the components 12,14 is exhausted out of the middle of the motor housing 18. In this manner, the motor 10 is evenly cooled to prevent the occurrence of a "hot side" of the motor 10 during operation. Additionally, the ninety degree offset generally prevents the hot exhausted air from being drawn back into the intake openings. That is to say, the relatively warmer exhaust air will naturally rise relative to the cooler ambient air, therefore, the upper intake openings being offset ninety degrees from the exhaust openings 76,78,80,82 greatly reduces the risk of the hot exhaust air being drawn back into the upstream intake openings (particularly when the filtration boxes 20,22 are utilized). In this manner, the motor 10 is optimally cooled to minimize the operating temperature of the power-driving components 12,14.

As previously indicated, the illustrated motor 10 with the filtration boxes 20,22 (e.g., FIGS. 1 and 2) complies with NEMA standards for a weather-protected Type II motor. The filtration boxes 20,22 can be relatively quickly and easily removably coupled to the primary motor housing 18 to guard air intake through the housing 18 to the stator 12 and the rotor assembly 14. When the boxes 20,22 are coupled to the housing 18, each of the boxes 20,22 is associated with a pair of upper and lower intake openings. In more detail, and turning to FIGS. 3 and 4, the filtration boxes 20,22 are coupled to opposite sides 56,64, respectively, of the housing 18 so that the housing 18 is received between the boxes 20,22. In this manner, the boxes 20,22 are diametrically opposed relative to the center axis $A_{LC}$. For purposes that will subsequently be described, this symmetrical positioning of the boxes 20,22 enables a balanced, streamlined motor enclosure 16 that provides several advantages.

Each of the filtration boxes 20,22 are virtually identically configured, therefore, only the filtration box 20 will be described in detail with the understanding that the box 22 is similarly constructed. The filtration box 20 includes an upper air inlet 96 associated with the upper air intake opening 68. In this regard, and as further detailed below, the box 20 defines an upper fluid passageway 98 that fluidly communicates the upper air inlet 96 with the upper air intake opening 68 (see FIG. 4). Similarly, the filtration box 20 includes a lower air inlet 100 and defines a lower fluid passageway 102 that fluidly communicates the lower inlet 100 with the lower air intake opening 70. Particularly, the filtration box 20 includes a pair of spaced apart, generally parallel, flat sidewalls 104 and 106. Each of the sidewalls 104,106 is generally trapezoidal in shape and, for purposes that will subsequently be described, presents a plurality of apertures 108 and 110, respectively, along the major dimensioned edge (see FIGS. 3 and 5). As will be further described below, formed in each of the side-walls 104,106 is a corresponding threaded flange 112 and 114, with each of the flanges shown sealed with a threaded cap 116. For purposes that will subsequently be described, the pair of sidewalls 104,106 are spaced apart a width dimension that is less than the diameter of the body of the motor housing 18 but greater than the width of the sidewall 64 of the housing 18 (see FIG. 6). Additionally, each of the sidewalls 104,106 extends in a plane that is generally equal distance from the center axis $A_{LC}$ Extending between the sidewalls 104,106 is an inside cover panel 118, an outside cover panel 120, and an interior baffling 122.

The inside cover panel 118 of the filtration box 20 is a generally flat panel that extends substantially along the major dimensioned edges of the sidewalls 104,106. For purposes that will become apparent, the panel 118 is recessed relative to the major dimensioned edges of the sidewalls 104,106 so that the fastener apertures 108,110 are positioned between the inside cover panel 118 and the motor housing wall side 64. The inside cover panel 118 presents an upper air outlet 124 and a lower air outlet 126 (see FIGS. 3–5) formed therein. The upper outlet 124 is adjacent the top edge of the panel 118 and the lower outlet 126 is adjacent the lower edge of the panel 118. Each of the outlets 124,126 is configured to fluidly communicate with the upper and lower air intake openings 68 and 70, respectively, and are each generally coextensive therewith.

The outside cover panel 120 of the filtration box 20 is an angular panel that extends substantially along the minor dimensioned edges of the sidewalls 104,106 and the angular edges of the sidewalls 104,106. The panel 120 includes a bottom section 120a, a back section 120b, and a top section 120c. The bottom section 120a extends between the bottom angular edges of the sidewalls 104,106 and terminates at, and is coupled to, the bottom edge of the inside cover panel 118. The lower air inlet 100 is formed in the bottom section 120a. The middle section 120b extends between the minor dimensioned edges of the sidewalls 104,106. The upper air inlet 96 is formed in the middle section 120b of the outside cover panel 120. For purposes that will subsequently be described, formed in the middle section 120b on either side of the air inlet 96 is a pair of filter-receiving slots 128 and 130 (see FIG. 3). As will be further detailed below, formed in the panel 120 adjacent the air inlets 96,100 and the slots 128,130 are a plurality of fastener-receiving apertures. As indicated above, the boxes 20,22 are symmetrically positioned and balanced on the motor housing 18. In this regard, the back wall of each of the boxes 20,22 (e.g., the middle section 120b of the outside cover panel 120 of the box 20) are generally equal distance from the center axis $A_{LC}$. The top section 120c of the panel 120 extends between top angular edges of the sidewalls 104,106 and is coupled to the top edge of the inside cover panel 118. However, unlike the bottom section 120a, the top section 120c does not terminate at the panel 118. Instead, and as will be subsequently described in detail, one of the components of the coupling mechanism (described below) is integrally formed with the top section 120c of the panel 120 in the illustrated filtration box 20.

As previously indicated, the filtration box 20 includes the interior baffling 122. Particularly, the baffling 122 extends between the sidewalls 104,106 and extends between the outside cover panel 120 and the inside cover panel 118. In this manner, the baffling 122 divides the interior of the box 20 into an upper chamber 20a and a lower chamber 20b (see FIG. 4). The baffling 122 includes two bends that define a lower section 122a, a middle section 122b, and an upper section 122c. The lower section 122a of the baffling 122 extends from the middle section 120b of the panel 120 just below the upper air inlet 96 and angles upwardly to the first bend therein. The middle section 122b of the baffling 122 extends generally parallel to the middle section 120b of the panel 120 and extends between the two bends in the baffling 122. The upper section 122c of the baffling 122 extends between the second bend and the inside cover panel 118 and is generally perpendicular to the middle section 122b.

The baffling 122 cooperates with the sidewalls 104,106 and the panels 118,120 to define the upper fluid passageway 98 in the upper chamber 20a and the lower fluid passageway 102 in the lower chamber 20b. Each of the fluid passageways 98,102 are deviated passageways that direct an air stream into the motor housing 18 and generally filter undesired debris out of the ambient air stream drawn through the inlets 96,100 prior to the air stream reaching the drive components 12,14. In more detail, the upper fluid passageway 98 directs the stream of air through the upper chamber 20a and into the motor housing 18 generally along the path designated by arrows 98a and 98b in FIG. 4. As detailed below, once the air stream exits the chamber 20a it enters the motor housing 18 through the upper air intake opening 68 and flows to the drive components 12,14 generally along the path designated by arrow 98c in FIG. 4. When the rotor 14 rotates, ambient air adjacent the filtration box 20 is induced through the upper air inlet 96 and into the upper chamber 20a as indicated by the arrow 98a. Once the air stream enters the upper chamber 20a, the air stream deflects off of the lower and middle sections 122a,b of the baffling and is diverted ninety degrees where it proceeds upwardly between the baffling 122, the outside cover panel 120, and the sidewalls 104,106. As the air stream contacts the baffling sections 122a,b, debris is caused to fall out of the air stream. As the air stream proceeds along the upper fluid passageway 98, the air stream deflects off of the top section 120c of the panel 120 and is diverted ninety degrees again where it proceeds into the upper air intake opening 68 as indicated by the arrow 98b. Again, portions of the remaining airborne debris are caused to drop out of the air stream when it engages the panel 120 prior to entering the primary motor housing 18.

In a similar manner, the lower fluid passageway 102 directs a stream of air through the lower chamber 20b and into the motor housing 18 generally along the path designated by arrows 102a and 102b in FIG. 4 where airborne debris is knocked out of the stream by engagement with portions of the filtration box 20 defining the lower chamber 20b. When the rotor 14 rotates, ambient air adjacent the filtration box 20 is induced through the lower air inlet 100 and into the lower chamber 20b as indicated by the arrow 102a. Once the air stream enters the lower chamber 20b, the air stream deflects off of the lower section 122a of the baffling 122 and is diverted ninety degrees toward the inside cover panel 118 where it is diverted another ninety degrees and directed toward the lower air intake opening 70. As the air stream proceeds along the lower fluid passageway 102, the air stream deflects off of the bottom section 120a of the outside cover panel 120 and diverted ninety degrees into the primary motor housing 18. Once the air stream exits the chamber 20b it enters the motor housing 18 through the lower air intake opening 70 and flows to the drive components 12,14 generally along the path designated by arrow 102c in FIG. 4.

As just described, the upper and lower chambers 20a,20b each define a plurality of ninety degree bends in the upper and lower fluid passageways 98,102, respectively. Once the air streams exit the chambers 20a,20b and enter the motor housing 18, the air dams 88,90 further deflect the corresponding air streams at least one additional ninety degree bend into the air deflectors 84,86 prior to the air stream entering the drive components 12,14 as indicated by the arrows 98c,102c in FIG. 4. In this manner, the motor 10 having the filtration boxes 20,22 satisfy the NEMA standards for a Type II weather-protected motor. As detailed above, the NEMA standards further require either an area of low velocity (e.g., not exceeding 600 fpm) or an easy to clean (e.g., removable) filter in the air intake path. In this regard, in addition to the air filtration provided by the deviated passageways, each of the chambers 2a,20b is also provided with a low velocity area and is configured to removably receive an air filter in the respective fluid passageway 98,102. Particularly, each of the inlets 96,100 is sufficiently spaced from the rotor 14 so that ambient air induced through the inlets 96,100 does not exceed six-hundred feet per minute prior to reaching the first ninety degree bend. Each of the chambers 20a,20b further includes a corresponding air dam plate 132 and 134 respectively, extending between the sidewalls 104,106 that further define the fluid passageways 98,102 so that air induced through the respective inlet 96,100 must deviate at the first ninety degree bend to thereby preserve the low velocity area. Because the lower air inlet 100 is closer in proximity to the rotor 14 than the upper air inlet 96, the air dam plate 134 in the lower chamber 20b is configured differently than the air dam plate 132 in the upper chamber 20a. Particularly, the air dam plate 134 is more pronounced and is configured to define a one-hundred and eighty degree bend in the lower fluid passageway 102.

As shown in FIG. 4, each of the chambers 20a,20b is configured to removably receive a filter 136 and 138, respectively, in the corresponding fluid passageway 98,102. In this regard, each of the chambers 20a,20b includes a corresponding pair of spaced apart filter-receiving channels (with only the channels 136a and 138a, respectively, fixed to the sidewall 106 being shown in FIG. 4). The channels associated with the filter 136 (e.g., the channel 136a) are each fixed to a corresponding sidewall 104,106, respectively, and extend between the cover panel 120 and the baffling 122. The channels associated with the filter 138 (e.g., the channel 138a) are each fixed to a corresponding sidewall 104,106, respectively, and extend between the cover panel 120 and the air dam plate 134. The filter-receiving channels 136a,138a are aligned with the corresponding filter-receiving slots 128,130, respectively. In this manner, the filters 136,138 can be easily inserted and/or removed from the channels through the corresponding slots 128,130. Each of the slots 128,130 also includes an associated filter cover plate 140 and 142, respectively, that is removably fastened to the cover panel 120 by threaded fasteners, such as screws, bolts, etc. (not shown), received in the adjacent fastener-receiving apertures. It is not necessary to utilize the filters 136,138 to obtain adequate filtration of the air streams, however, if the filters 136,138 are utilized, the filters should be periodically removed and cleaned and/or replaced to ensure proper air filtration. In this regard, a pressure differential switch (partially shown as reference numeral 144 in FIG. 4) can be screwed into one or both of the threaded flanges 112,114 in place of the caps 116. The switch 144 preferably monitors the increases in the pressure drop through the filter 136 as a method of detecting the accumulation of debris in the filter 136. One such suitable switch is available as Model No. 1950 from Dwyer Instruments, Inc. of Michigan City, Ind.

In addition to the air filtration provided as detailed above, each of the air inlets 96,100 are protected by a corresponding screen 96a and 100a, respectively. The screens 96a,100a couple to the outside cover panel 118 with threaded fasteners, such as screws, bolts, etc. (not shown), received in the adjacent fastener-receiving apertures. It is believed the fluid passageways 98,102 enable the most effective and efficient filtration of air provided to the air intake openings 68,70 of the motor housing 18 and comply with the NEMA standards for a Type II motor. As previously indicated, the fluid passageways of the filtration box 22 are virtually identically configured to those of the filtration box 20 detailed above. However, it is within the ambit of the present invention to utilize various alternative designs and configurations for the fluid passageways provided by the filtration boxes. For example, the boxes need not define two separate passageways, particularly where the boxes are utilized on a motor housing defining only one air intake associated with each box. However, it is important that the boxes define passageways that enable compliance with the NEMA standards for a Type II weather-protected motor (e.g., at least three ninety degree bends and a low velocity area or a removable filter).

Figure 6:
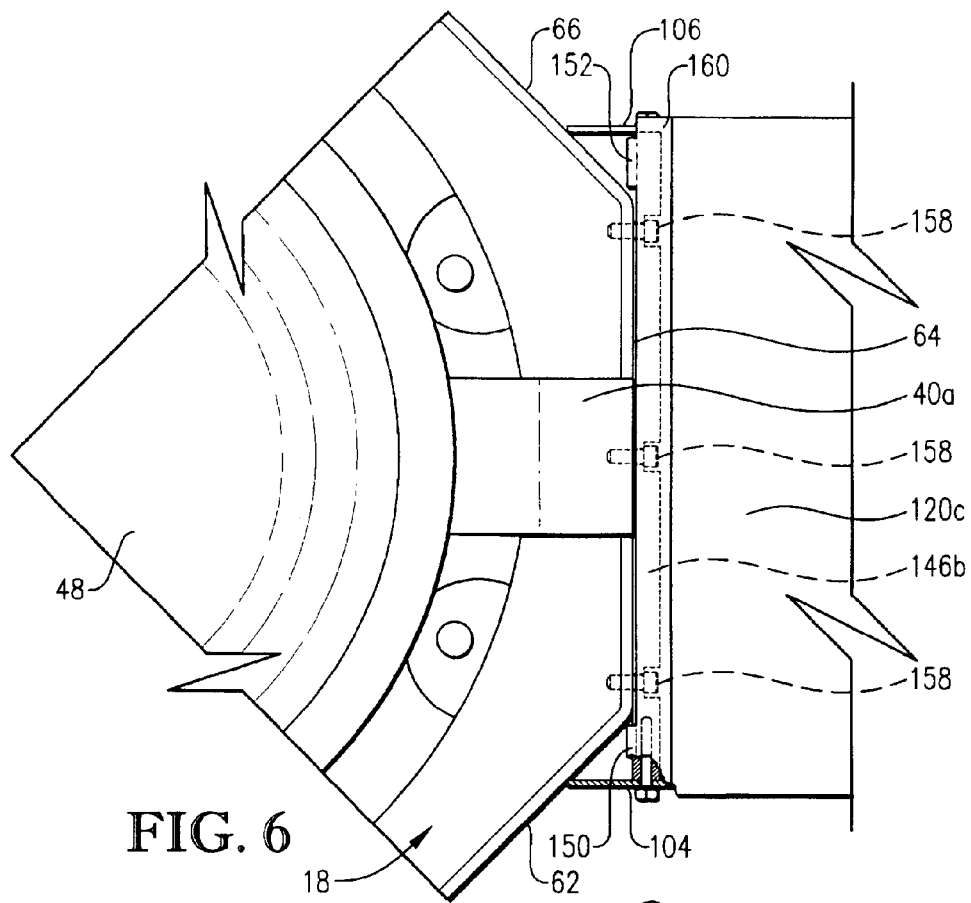
FIG. 6 is a fragmentary top view of the motor illustrated in the above FIGS. and showing generally a quarter section of the motor to illustrate the coupling mechanism between the right filtration box and the primary motor housing.

Turning to FIGS. 3–6, and as indicated above, the filtration box 20 can be relatively quickly and easily removably coupled to the primary motor housing 18 in order to convert the motor from a Type I to a Type II weather-protected motor. In this regard, the box 20 includes a coupling mechanism for removably coupling the box 20 to the motor housing 18. The illustrated coupling mechanism includes a pair of adapter plates 146 and 148 and a pair of hooks 150 and 152 for latchingly engaging the upper adapter plate 146 to support the box 20 on the motor housing 18. In more detail, the upper and lower adapter plates 146,148 are each configured to couple to the side-wall 64 of the motor housing 18 around a corresponding one of the intake openings 68,70, respectively. The adapter plates 146,148 are virtually identically configured and accordingly only the upper adapter plate 146 will be described in detail with the understanding that the lower adapter plate 148 is similarly constructed. The adapter plate 146 is a four-sided, generally rectangular frame-like structure that defines an inner portal 146a that circumscribes the upper air intake opening 68 when the plate 146 is coupled to the sidewall 64 of the motor housing 18 (see FIG. 5). The plate 146 includes a plurality of fastener-receiving apertures 154 formed through the frame adjacent the portal 146a. For purposes that will subsequently be described, the plate 146 further includes a plurality of fastener-receiving apertures 156 formed through the side of the frame and sized and dimensioned to complementally align with the bolt apertures 108,110 of the sidewalls 104, 106. The adapter plate 146 is coupled to the side 64 of the motor housing 18 with a plurality of threaded fasteners 158 (e.g., bolts, screws, etc.) received through the apertures 154 (see FIGS. 3 and 6). The plate 146 presents a top edge 146b that is dimensioned so that, when the plate 146 is coupled to the side 64 of the housing 18, each side of the top edge 146b extends beyond the margins of the side 64 as shown in FIG. 6. Additionally, the plate 146 is dimensioned so that when the filtration box 20 is coupled to the plate 146 as detailed below, the plate 146 is received between the side 64, the inside cover panel 118, and the sidewalls 104,106 so that the sidewalls 104,106 extend beyond the plate 146 and the side 64. For example, as shown in FIG. 6, in the illustrated motor 10, the sidewalls 104,106 engage the sides 62,66, respectively.

Figure 5:
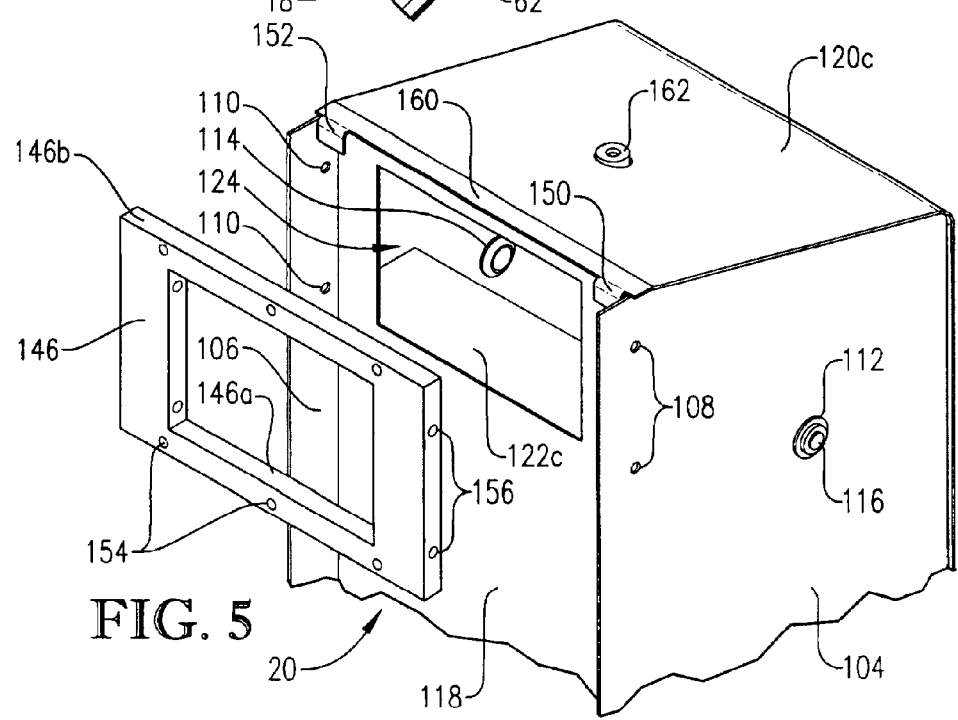
FIG. 5 is a fragmentary perspective view of the right filtration box shown with an adaptor plate and illustrating the coupling mechanism for coupling the box to the primary motor housing.

The illustrated pair of hooks 150,152 of the coupling mechanism are integrally formed with the top section 120c of the outside cover panel 120 as shown in FIG. 5. Particularly, a coupling bar 160 extends from the top section 120c and comprises the portion of the section 120c that extends past the inside cover panel 118 (see FIG. 5). The hooks 150,152 are integrally formed with, and extend from either side of, the coupling bar 160. The hooks 150,152 and the coupling bar 160 are configured to cooperate to latchingly receive the top edge 146 of the adapter plate 146 when the filtration box 20 is coupled to the motor housing 18 (see FIG. 6). The hooks 150,152 are sized, dimensioned and spaced to engage the portion of the top edge 146b that extends beyond the margins of the side 64 as shown in FIG. 6. In this manner, the filtration box 20 can be "hung" on the motor housing 18 by engaging the hooks 150,152 with the adapter plate 146. Once the box 20 has been hung on the motor housing 18, fasteners (e.g., bolts, screws, etc.) can be threaded through the complementing apertures 108,110 and 156 to further secure the filtration box 20 to the primary motor housing 18.

It will be appreciated that the motor 10 is a relatively heavy motor, typically weighing between four-thousand and six-thousand pounds. The protective motor enclosure 16 is preferably formed from a hard metal (e.g., steel or other iron alloys, etc.) and thus each of the filtration boxes 20,22 can account for in excess of one-thousand pounds of the total motor weight. The improved motor enclosure 16 with the inventive coupling mechanism enables the modular filtration boxes 20,22 to be quickly and easily secured to the primary motor housing 18. For example, the filtration boxes 20,22 can be secured to the motor housing 18 in as little as ten minutes time, significantly less than the one day required to secure the prior art shrouds. The reduced time to couple the filtration boxes 20,22 is in large part due to the fact that the coupling mechanism enables the boxes 20,22 to be hung on the motor housing 18 and thus supported thereon while the boxes 20,22 are fastened to the housing 18. In this regard, each of the boxes 20,22 include lifting provisions to facilitate hanging the boxes 20,22 on the housing 18. For example, the filtration box 20 includes an internally threaded rod 162 gusseted to the top section 120c of the outside cover panel 120 (see FIG. 4). The rod 162 is configured to threadably receive an eyebolt (not shown) for lifting the box 20 (e.g., with a crane, hoist, etc.). In this regard, the rod 162 is preferably located generally at the center of gravity of the box 20 to facilitate moving and hanging the box 20. Although not shown, the filtration box 20 preferably includes a similar lifting provision located generally at the center of gravity of the box 20 on one or both of the sidewalls 104,106 to facilitate lifting and/or hanging the box 20 onto the motor housing 18 when the motor is oriented horizontally (e.g., on a horizontal dynamometer, etc.).

Additionally, the inventive protective motor enclosure 16 with the easily couplable and removable filtration boxes 20,22 enable the motor 10 to be quickly and easily interchanged and/or converted between a weather-protected Type I and weather-protected Type II motor. This conversion, as further detailed below in the operation section, is enabled by the inventive coupling mechanism and in part by the fact that the boxes 20,22 are configured to couple to the motor housing 18 without interfering with the drive component fittings, such as oil supply lines and oil drain lines (see FIG. 3). In this regard, the filtration boxes 20,22 are simply hung on the housing 18 and bolted thereto, without the need for any specially manufactured fittings, cuts, welds, etc. Accordingly, the motor of the present invention can be stocked as a Type I motor along with the inventive and simple Type II conversion kits, as detailed below (e.g., filtration boxes 20,22, adapter plates 146,148, fasteners 158, filters 136,138, etc.). Furthermore, the unique motor of the present invention can be tested on a horizontal dynamometer either as a Type I or Type II motor (e.g., with the filtration boxes 20,22 attached) and the boxes 20,22 can be removed or added to the housing 18 while the motor is on the dynamometer.

It is within the ambit of the present invention to utilize various alternative configurations for the coupling mechanism for the filtration boxes 20,22. For example, the adapter plates 146,148 could be coupled to the box 20 and the coupling bar 160 and hooks 150,152 could be fixed to the motor housing 18. Additionally, it is not necessary that a pair of hooks be utilized or even that hooks be utilized at all.

However, it is important that the coupling mechanism enables filtration box 20 to be quickly and easily hung on the motor housing and supported thereon prior to securing (i.e., fastening, etc.) the box 20 to the housing 18.

As indicated above, filtration box 22 is virtually identically configured as the box 20 and couples to the motor housing 18 in a similar fashion. In this regard, the illustrated motor 10 is a symmetrical, balanced weather-protected Type II motor having a center of gravity that is generally located along the rotational and longitudinal center axis $A_{LC}$. In this manner, the relatively heavy weight of the motor 10 does not impede or interfere with elevated applications. For example, as shown in FIG. 1, the illustrated motor 10 is well suited for vertical-shaft applications, such as mounted above the outdoor, vertical-shafted pump P for pumping fluid (e.g., water, oil, etc.) through the pipeline L. However, it is within the ambit of the present invention to utilize various alternative designs and configurations for the motor enclosure 16. For example, the principles of the present invention are not limited to an enclosure having a pair of filtration boxes. However, it is important that the motor enclosure enables a modular filtration housing that complies with the NEMA standards for a weather-protected Type II motor to be quickly and easily secured to the motor to protect the air intake openings from weather and other undesired debris. Additionally, it is important that enclosure enables a weather-protected Type I motor to be quickly and easily converted to a Type II motor.

In operation, the motor can be operated as either a weather-protected Type I motor or a weather-protected Type II motor, as shown in FIG. 3, can be easily inter-changed and/or converted from a Type I to a Type II. To operate the motor as a Type I motor, the filtration boxes 20,22 are not used (or are removed as detailed below). The upper air intake openings (e.g., the opening 68) in the motor housing 18 are guarded by fastening the screens 92,94 to the housing 18. The lower air intake openings (e.g., the opening 70) are not utilized and thus are covered with intake covers 164 and 166 by fastening the covers 164,166 to the motor housing 18 as shown in FIG. 3. Instead, the bottom air intake openings 72 are utilized and thus the intake covers 74 are not utilized (i.e., removed). Three-phase power is connected to the conduit box 30 and the rotor 14 is rotated relative to the stator 12. When the rotor 14 rotates, ambient air adjacent the openings 68,72 is drawn through the openings and directed to the drive components 12,14 to thereby cool the wire coil 24, the plates 26, the bars 28, and the lamination stack 32. The hot air is then exhausted through the exhaust openings 76,78,80,82. The rotating rotor 14 causes the shaft 38 to rotate to thereby drive the application connected to the motor (e.g., the pump P).

To convert the motor from a Type I motor as previously described to a Type II motor 10, the filtration boxes 20,22 must be added to the motor housing 18. In particular, the screens 92,94 and the intake covers 164,166 are removed from the housing 18. The bottom air intake openings 72 are not utilized and thus the intake covers 74 are fastened to the housing 18 covering the openings 72. Next, the adapter plates (e.g., adapter plates 146,148) are bolted to the housing 18 over the upper and lower intake openings (e.g., openings 68,70) by threading the fasteners 158 through the apertures 154 and into the housing 18 (e.g., into the apertures formed in the side 64). The filtration boxes 20,22 are then hung on the adapter plates and supported thereon by the hooks (e.g., by the hooks 150,152). For example, each of the boxes 20,22 could be lifted with a crane connected to the lifting provisions (e.g., the lifting provision 162) and hung on the housing 18. Once the boxes 20,22 are supported on the motor housing 18, the boxes 20,22 can be secured to the housing 18 by bolting the boxes 20,22 to the adapter plates (e.g., by inserting bolts through the complementally aligned apertures 156 and 108,110). The filters 136,138 are then slid through the filter-receiving slots 128,130 into the channels (e.g., the channels 136a,138a) and the filter cover plates 140,142 are secured to the cover panel 120 over the slots 128,130. Optionally, because the illustrated boxes 20,22 provide for a low velocity area, use of the filters 136,138 is not required. Finally, the screens 96a,100a are fastened to the cover panel 120 over the corresponding air inlets 96,100, respectively. The illustrated Type II motor 10 operates in similar fashion as that described above with respect to the Type I motor. However, ambient air is first induced through the air inlets 96,100 and drawn through the fluid passageways 98,102 prior to entering the air intake openings 68,70 as shown in FIG. 4.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An air-cooled weather-protected motor comprising:

a stator;

a rotor rotatable relative to the stator about a rotational axis;

a vented protective motor enclosure protectively enclosing the stator and rotor while permitting airflow thereto, said enclosure including a primary motor housing in which the stator and rotor are at least substantially housed, said motor housing presenting a plurality of spaced apart air intake openings through which ambient air is induced into the motor housing when the rotor is rotated, said enclosure further including an air intake box removably coupled to the motor housing in association with at least one of said intake openings, said intake box being configured to generally filter ambient air drawn into the enclosure and including at least one air inlet and defining at least one deviated passageway fluidly communicating the inlet and said at least one intake opening, said intake box defining at least two bends in the at least one deviated passageway; and a coupling mechanism removably coupling the intake box to the motor housing, said coupling mechanism including an adapter plate and at least one hook latchingly engaging the adapter plate to support the intake box on the motor housing.

2. The motor as claimed in claim 1, said adapter late being coupled to the motor housing.

3. An air-cooled weather-protected motor comprising:

a stator;

a rotor rotatable relative to the stator about a rotational axis;

a vented protective motor enclosure protectively enclosing the stator and rotor while permitting airflow thereto, said enclosure including a primary motor housing in which the stator and rotor are at least substantially housed, said motor housing presenting a plurality of spaced apart air intake openings through which ambient air is induced into the motor housing when the rotor is rotated, said enclosure further including an air intake box removably coupled to the motor housing in association with at least one of said intake openings, said intake box being configured to generally filter ambient air drawn into the enclosure and including at least one air inlet and defining at least one deviated passageway fluidly communicating the inlet and said at least one intake opening; and a coupling mechanism removably coupling the intake box to the motor housing, said coupling mechanism including an adapter plate and at least one hook latchingly engaging the adapter plate to support the intake box on the motor housing, said adapter plate being coupled to the motor housing, said adapter plate presenting a generally rectangular outer margin and defining an inner aperture that circumscribes said at least one intake opening.

4. The motor as claimed in claim 3, said adapter late being coupled to the motor housing with threadable fasteners.

5. The motor as claimed in claim 3, said motor using including a tubular body presenting at least one planar sidewall, said at least one intake opening being defined in said sidewall.

6. The motor as claimed in claim 5, said adapter plate overlying the sidewall in a generally parallel relationship, said sidewall defining a sidewall width, said outer margin presenting a top edge, at least a portion of said top edge extending beyond the width of the sidewall.

7. The motor as claimed in claim 6, said hook being fixed relative to the intake box.

8. The motor as claimed in claim 7, said hook engaging said at least a portion of said top edge.

9. The motor as claimed in claim 8, said intake box including a pair of generally parallel spaced box side walls and a top wall extending between the box side walls.

10. The motor as claimed in claim 9, said hook being integrally formed with said top wall.

11. The motor as claimed in claim 10, said adapter plate being received between said box side walls, said box side walls being coupled to the adapter plate with threadable fasteners.

12. An air-cooled weather-protected motor comprising:

a stator;

a rotor rotatable relative to the stator about a rotational axis;

a vented protective motor enclosure protectively enclosing the stator and rotor while permitting airflow thereto, said enclosure including a primary motor housing in which the stator and rotor are at least substantially housed, said motor housing presenting a plurality of spaced apart air intake openings through which ambient air is induced into the motor housing when the rotor is rotated, said enclosure further including an air intake box removably coupled to the motor housing in association with at least one of said intake openings, said intake box being configured to generally filter ambient air drawn into the enclosure and including at least one air inlet and defining at least one deviated passageway fluidly communicating the inlet and said at least one intake opening; and a coupling mechanism removably coupling the intake box to the motor housing, said coupling mechanism including an adapter plate and at least one hook latchingly engaging the adapter plate to support the intake box on the motor housing, said motor using including a tubular body defining a longitudinal center axis, said intake box presenting a pair of first sidewalls spaced on either side of the intake box passageway, said first sidewalls extending in generally parallel planes spaced on either side of the center axis.

13. The motor as claimed in claim 12, said tubular body presenting at least one planar sidewall spaced from the center axis, said at least one intake opening being defined in said planar sidewall.

14. The motor as claimed in claim 13, said adaptor plate being coupled to the planar sidewall, said planar sidewall and said adaptor plate being received between said first sidewalls.

15. The motor as claimed in claim 14, said intake box including an outer wall that extends between the first sidewalls and cooperates therewith to in part form said passageway.

16. The motor as claimed in claim 15, said hook being fixed relative to the outer wall.

17. The motor as claimed in claim 16, said coupling mechanism including an additional hook fixed relative to the outer wall and spaced from said first-mentioned hook to latchingly engage the adapter plate to support the intake box on the motor housing.

18. The motor as claimed in claim 17, said rotor presenting a first end and an oppositely spaced second end, said at least one intake opening being positioned adjacent said first end.

19. The motor as claimed in claim 18, said plurality of intake openings presenting an additional air intake opening defined in the planar sidewall and positioned adjacent the second end of the rotor, said intake box including an additional air inlet and defining an additional passageway fluidly communicating the additional inlet and the additional intake opening.

20. The motor as claimed in claim 19, said coupling mechanism including an additional adaptor plate coupled to the planar sidewall and being received between said first sidewalls.

21. The motor as claimed in claim 20, said first sidewalls being threadably fastened to the first-mentioned and the additional adaptor plates.

22. The motor as claimed in claim 16,
said passageway and said intake opening cooperating to define at least three bends of at least ninety degrees between the inlet and the rotor.

23. An air-cooled weather-protected motor comprising:
a stator;
a rotor rotatable relative to the stator about a rotational axis;
a vented protective motor enclosure protectively enclosing the stator and rotor while permitting airflow thereto,
said enclosure including a primary motor housing in which the stator and rotor are at least substantially housed,
said motor housing presenting a plurality of spaced apart air intake openings through which ambient air is induced into the motor housing when the rotor is rotated,
said enclosure further including an air intake box removably coupled to the motor housing in association with at least one of said intake openings,
said intake box being configured to generally filter ambient air drawn into the enclosure and including at least one air inlet and defining at least one deviated passageway fluidly communicating the inlet and said at least one intake opening; and
a coupling mechanism removably coupling the intake box to the motor housing,
said coupling mechanism including an adapter plate and at least one hook latchingly engaging the adapter plate to support the intake box on the motor housing,
said intake openings being arranged so as to present at least one pair of generally diametrically opposed intake openings relative to the rotational axis; and
a second intake box removably coupled to the motor housing and generally diametrically opposed to the first-mentioned intake box,
said second intake box being in fluid communication with one of the pair of intake openings,
said second intake box including at least one second air inlet and defining at least one second passageway fluidly communicating the second inlet and said one of the pair of intake openings,
said coupling mechanism including a second adapter plate and a second hook latchingly engaging the second adapter plate to removably couple the second intake box to the motor housing.

24. An air-cooled weather-protected motor comprising:
a vented protective motor enclosure including a primary motor housing that presents a plurality of spaced apart air intake openings through which ambient air is induced into the motor housing,
said enclosure further including an air intake box removably coupled to the motor housing in association with at least one of said intake openings,
said intake box being configured to generally filter ambient air drawn into the enclosure and including at least one air inlet and defining at least one deviated passageway fluidly communicating the inlet and said at least one intake opening,
said intake box being removably supported on the motor housing,
said intake box defining at least two bends in the at least one deviated passageway.

25. The motor as claimed in claim 24; and
a coupling mechanism that includes an adapter plate and at least one hook latchingly engaging the adapter plate to removably support the intake box on the motor housing.

26. The motor as claimed in claim 25,
said adapter plate being fixed to the motor housing, and said hook being fixed relative to the intake box.

27. An air-cooled weather-protected motor comprising:
a vented protective motor enclosure including a primary motor housing that presents a plurality of spaced apart air intake openings through which ambient air is induced into the motor housing,
said enclosure further including an air intake box removably coupled to the motor housing in association with at least one of said intake openings,
said intake box being configured to generally filter ambient air drawn into the enclosure and including at least one air inlet and defining at least one deviated passageway fluidly communicating the inlet and said at least one intake opening,
said intake box being removably supported on the motor housing,
a coupling mechanism that includes an adapter plate and at least one hook latchingly engaging the adapter plate to removably support the intake box on the motor housing,
said adapter plate being fixed to the motor housing, and said hook being fixed relative to the intake box,
said adapter plate presenting a generally rectangular outer margin and defining an inner aperture that circumscribes said at least one intake opening.

28. An air-cooled weather-protected motor comprising:
a vented protective motor enclosure including a primary motor housing that presents a plurality of spaced apart air intake openings through which ambient air is induced into the motor housing,
said enclosure further including an air intake box removably coupled to the motor housing in association with at least one of said intake openings,
said intake box being configured to generally filter ambient air drawn into the enclosure and including at least one air inlet and defining at least one deviated passageway fluidly communicating the inlet and said at least one intake opening,
said intake box being removably supported on the motor housing,
a coupling mechanism that includes an adapter plate and at least one hook latchingly engaging the adapter plate to removably support the intake box on the motor housing,
said adapter plate being fixed to the motor housing, and said hook being fixed relative to the intake box,
said intake box including a pair of generally parallel spaced box side walls and a top wall extending between the box side walls.

29. The motor as claimed in claim 28,
said hook being integrally formed with said top wall.

30. An air-cooled weather-protected motor comprising:
a vented protective motor enclosure including a primary motor housing that presents a plurality of spaced apart air intake openings through which ambient air is induced into the motor housing,
said enclosure further including an air intake box removably coupled to the motor housing in association with at least one of said intake openings, said intake box being configured to generally filter ambient air drawn into the enclosure and including at least one air inlet and defining at least one deviated passageway fluidly communicating the inlet and said at least one intake opening, said intake box being removably supported on the motor housing, a coupling mechanism that includes an adapter plate and at least one hook latchingly engaging the adapter late to removably support the intake box on the motor housing, said motor housing presenting a first end and an oppositely spaced second end;

said at least one intake opening being positioned adjacent said first end, said plurality of intake openings presenting an additional air intake opening defined in the motor housing and positioned adjacent the second end thereof, said intake box including an additional air inlet and defining an additional deviated passageway fluidly communicating the additional inlet and the additional intake opening.

31. The motor as claimed in claim 30, said coupling mechanism including an additional adaptor plate coupled to the motor housing.

32. An air-cooled weather-protected motor comprising:

a vented protective motor enclosure including a primary motor housing that presents a plurality of spaced apart air intake openings through which ambient air is induced into the motor housing, said enclosure further including an air intake box removably coupled to the motor housing in association with at least one of said intake openings, said intake box being configured to generally filter ambient air drawn into the enclosure and including at least one air inlet and defining at least one deviated passageway fluidly communicating the inlet and said at least one intake opening, said intake box being removably supported on the motor housing, said intake openings being arranged so as to present at least one pair of generally diametrically opposed intake openings;

a second intake box removably coupled to the motor housing and generally diametrically opposed to the first-mentioned intake box, said second intake box being in fluid communication with one of the pair of intake openings, said second intake box including at least one second air inlet and defining at least one second deviated passageway fluidly communicating the second inlet and said one of the pair of intake openings, said second intake box being removably supported on the motor housing.

* * * * *